United States Patent
Carr et al.

(10) Patent No.: US 7,463,650 B2
(45) Date of Patent: Dec. 9, 2008

(54) METHOD AND APPARATUS FOR SEGMENTATION AND REASSEMBLY OF DATA PACKETS IN A COMMUNICATION SWITCH

(75) Inventors: David Carr, Nepean (CA); Paul Nadj, Ottawa (CA); Sandra Stark, RR2 Dunrobin (CA)

(73) Assignee: Alcatel Lucent Canada Inc., Ottawa, Ontario (CA)

( * ) Notice: Subject to any disclaimer, the term of this patent is extended or adjusted under 35 U.S.C. 154(b) by 577 days.

(21) Appl. No.: 11/269,251

(22) Filed: Nov. 7, 2005

(65) Prior Publication Data
US 2006/0050738 A1 Mar. 9, 2006

Related U.S. Application Data

(62) Division of application No. 09/426,791, filed on Oct. 22, 1999, now Pat. No. 6,963,572.

(51) Int. Cl.
*H04J 3/24* (2006.01)
(52) U.S. Cl. .................................... 370/474
(58) Field of Classification Search ............... None
See application file for complete search history.

(56) References Cited

U.S. PATENT DOCUMENTS

| | | | |
|---|---|---|---|
| 5,420,858 A | 5/1995 | Marshall et al. |
| 5,430,727 A | 7/1995 | Callon |
| 5,509,123 A | 4/1996 | Dobbins et al. |
| 5,568,477 A | 10/1996 | Galand et al. |
| 5,777,984 A | 7/1998 | Gun et al. |
| 5,818,842 A | 10/1998 | Burwell et al. |
| 5,905,723 A | 5/1999 | Varghese et al. |
| 5,918,022 A | 6/1999 | Batz et al. |
| 5,951,649 A | 9/1999 | Dobbins et al. |
| 6,075,788 A | 6/2000 | Vogel |
| 6,078,963 A | 6/2000 | Civanlar et al. |

(Continued)

FOREIGN PATENT DOCUMENTS

GB 2324676 A 10/1998

(Continued)

OTHER PUBLICATIONS

Aweya, IP Router Architectures: An Overview, downloadable at http://citeseer.ist.psu.edu/aweya99ip.html, 48 pages, 1999.*

(Continued)

*Primary Examiner*—Frank Duong (57) ABSTRACT

A method and apparatus for segmenting and forwarding data packets received in a communication switch is presented. The method begins by receiving a packet that includes a destination that determines forwarding parameters. As the packet is being received, segmentation cells are created from portions of the packet received where each segmentation cell is provided to a switching fabric as soon as creation of the segmentation cell is completed. When an end portion of the packet is received, verification of proper receipt of the packet is performed. When it is determined that the packet has been received successfully, a verification data set is generated based on segmentation cells that have been utilized to forward the packet. If it is determined that the packet has not been successfully received, a purging data set is generated instead of the verification data set.

12 Claims, 5 Drawing Sheets

U.S. PATENT DOCUMENTS

| | | |
|---|---|---|
| 6,081,512 A | 6/2000 | Muller et al. |
| 6,160,811 A | 12/2000 | Partridge et al. |
| 6,212,185 B1 | 4/2001 | Steeves et al. |
| 6,243,382 B1 | 6/2001 | O'Neill et al. |
| 6,259,699 B1 | 7/2001 | Opalka et al. |
| 6,307,860 B1 | 10/2001 | Joffe et al. |
| 6,363,053 B1 | 3/2002 | Schuster et al. |
| 6,370,142 B1 | 4/2002 | Pitcher et al. |
| 6,374,303 B1 | 4/2002 | Armitage et al. |
| 6,463,067 B1 | 10/2002 | Hebb et al. |
| 6,487,170 B1 | 11/2002 | Chen et al. |

FOREIGN PATENT DOCUMENTS

| | | |
|---|---|---|
| WO | WO 99/27688 | 6/1999 |

OTHER PUBLICATIONS

Patridge et al, A 50-Gp/s IP Router, IEEE, 12 pages, Jun. 1998.*
Murakami et al., RFC 2171, MAPOS-Multiple Access Protocol over SONET/SDH version 1, pp. 1-9, Jun. 1997.

* cited by examiner

METHOD AND APPARATUS FOR SEGMENTATION AND REASSEMBLY OF DATA PACKETS IN A COMMUNICATION SWITCH

CROSS-REFERENCE TO RELATED APPLICATIONS

This application is a division of application Ser. No. 09/426,791, filed Oct. 22, 1999, and issuing as U.S. Pat. No. 6,963,572.

TECHNICAL FIELD OF THE INVENTION

The invention relates generally to communication switches and more particularly to a method and apparatus for segmentation and reassembly of data packets in a communication switch.

BACKGROUND OF THE INVENTION

Packet-based data communications systems send data packets through a network of switches in order to relay information included in the packets to a destination. Each of the switches in a network is typically capable of receiving input data from a number of different sources and providing this input data over a number of different outputs towards a number of different destinations. Such switches typically include a number of line cards that perform both reception (ingress data) and transmission (egress data) of the data packets. The line cards are often interconnected using a crossbar switch or similar mechanism such that any ingress data received on any one of the line cards can be provided as egress data on one or more of the other line cards of the switch.

When a packet is received at the ingress portion of one of the line cards, a determination as to the destination for the packet must be made, and the packet forwarded to the appropriate egress line card or line cards. In prior art solutions, portions of packets received are buffered until the entire packet has been received before any forwarding of the packet to the destination line card or line cards begins. Once the entire packet has been received, verification as to proper receipt of the packet can be performed, and then the packet is forwarded over the backplane, or switching fabric, of the switch to the one or more destination line cards for output. Because an ingress portion of a line card may receive data from a large number of connections, prior art solutions require a large amount of buffering space to store the portions of packets received via these multiple connections. Such buffering requirements add undesirable cost and complexity to systems.

Once the entire packet has been received, the packet is typically broken up into cells or other small fixed-data-length structures that are transferred across the backplane, or switching fabric, of the switch to the one or more egress line cards. Another disadvantage of prior art systems that require the receipt of the entire packet prior to forwarding is that the latency induced by such systems can significantly delay passage of the packet through the switch. For example, assume that the packet takes 20 microseconds to completely arrive within the ingress portion of the line card. Combining this arrival period with the time required to divide the packet into the fixed-length blocks for transmission across the backplane of the switch can significantly increase the total latency induced by the switch within the communication network. Such additional latency is undesirable, as it can affect overall data transmission speed.

A further disadvantage of these prior art systems that require receipt of the entire packet prior to forwarding is that the bandwidth available along the backplane of the switch is not optimally utilized. Because in prior art systems the packet is not divided into the fixed-length blocks for transmission across the backplane until the entire packet is received, these fixed-length blocks are typically provided to the backplane in quick succession. Thus, rather than spreading the bandwidth usage for transmission of a packet across a longer period of time, the bandwidth requirements for transmission of the packet grouped temporally. If receipt of a number of different packets is completed at approximately the same time, each of these packets will be attempted to be transmitted across the backplane of the switch in close temporal proximity to the others. This can cause bandwidth usage spikes on the backplane that can increase transmission delays through the switch. Additionally, this can increase the buffering requirements of the ingress portions of the line cards as it may not be possible to transmit data across the backplane as soon as the segmentation, or division into fixed-length blocks, is completed.

Therefore, a need exist for a method and apparatus for segmentation and forwarding of packets in communication switches that reduces buffering requirements and latency while improving efficiency of switch backplane bandwidth utilization.

DETAILED DESCRIPTION OF THE INVENTION

Generally, the present invention provides a method and apparatus for segmenting and forwarding data packets received in a communication switch. The method begins by receiving a packet that includes fields (e.g. packet destination, packet source, interface, etc.) that determine forwarding parameters. As the packet is being received, segmentation cells are created from portions of the packet received where each segmentation cell is provided to a switching fabric as soon as creation of the segmentation cell is completed. When an end portion of the packet is received, verification of proper receipt of the packet is performed. When it is determined that the packet has been received successfully, a verification data set is generated based on segmentation cells that have been utilized to forward the packet. The verification data set is then included in a final segmentation cell that is provided to the switching fabric. Such a verification data set can then be used by an egress line card that receives the segmentation cells to verify proper receipt of the segmentation cells. If it is determined that the packet has not been successfully received, a purging data set is generated instead of the verification data set. Such a purging data set is then included in the final segmentation cell that is provided to the switching fabric, where the purging data set preferably causes any egress line card to purge the corrupted packet rather than forwarding it.

By separating the received packet into the segmentation cells as it is being received and forwarding the segmentation cells immediately upon completion of their creation, the latency and buffering requirements of prior art segmentation and forwarding systems is greatly reduced. Additionally, the presentation of the segmentation cells to the backplane, or switching fabric, of the switch occurs in a more uniform manner over time such that bandwidth spikes on the backplane are minimized. Verification of the received packet and transmission of a final segmentation cell that indicates proper or improper receipt of the packet ensures that forwarding of an invalid packet by an egress line card does not occur.

Figure 1:
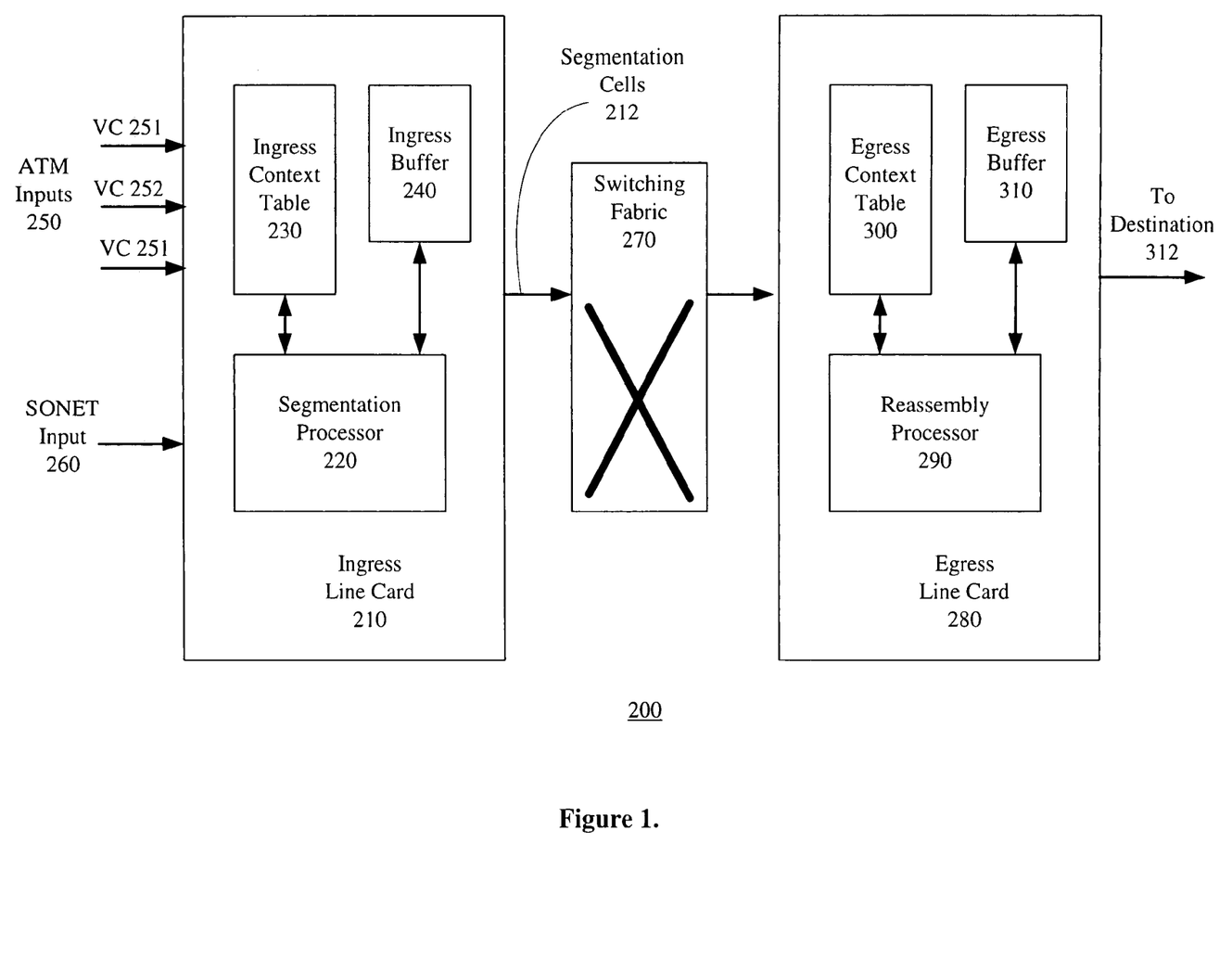
FIG. 1 illustrates a block diagram of a segmentation and reassembly circuit in accordance with the present invention.

The invention can be better understood with reference to FIGS. 1-6. FIG. 1 illustrates a segmentation and reassembly circuit 200 that is preferably included within a communication switch. More preferably, the communication switch is an ATM communication switch. The segmentation and reassembly circuit 200 includes a switching fabric 270, an ingress line card 210, and an egress line card 280. Preferably, the segmentation and reassembly circuit 200 is structured such that a plurality of line cards are coupled to the switching fabric 270 where each of the line cards has an ingress and an egress portion. In such a configuration any one line card may function as the ingress line card for a particular data packet and any other line card may function as the egress line card for such a data packet. More preferably, the segmentation and reassembly circuit 200 is included and an ATM switch such that the switching fabric 270 is an ATM backplane included in the ATM switch, and each of the line cards coupled to the ATM backplane is an ATM compatible line card.

The ingress line card 210, which may simply be the ingress portion or ingress block included in a line card, is operably coupled to receive data packets via one or more input connections. FIG. 1 illustrates the ingress line card 210 receiving both SONET format packets over a SONET input 260 and ATM cell-based packets over ATM inputs 250. Packets may also be received in a Frame Relay format. The ATM inputs 250 are shown to include a plurality of ATM virtual connections (VCs) 251-253, each of which may provide packets to the ingress line card 210 for forwarding.

Each of the packets received by the ingress line card 210 is broken up into a number of segmentation cells that are provided to the switching fabric 270. The switching fabric 270 routes each of the segmentation cells to an appropriate destination egress line card 280 where the segmentation cells are reassembled into a packet format and then provided to a destination. Segmentation of the received packet in the ingress block into the segmentation cells that are passed across the switching fabric is preferably accomplished by the segmentation processor 220 that is included and the ingress line card 210.

The segmentation processor 220 is operably coupled to an ingress context table 230 and an ingress buffer 240 which are provided to support the segmentation. When the ingress block receives a packet via either the ATM inputs 250 or the SONET input 260 (or via Frame Relay inputs), the segmentation processor creates segmentation cells from portions of the packet received. Each of these segmentation cells is provided to the switching fabric 270 as the creation of the segmentation cell is completed. Providing the segmentation cells to the switching fabric as soon as they are created minimizes the size of the ingress buffer 240 as the entire packet is not buffered prior to segmentation. The ingress context table 230 provides state information to the segmentation processor 220 concerning each of the various packets being received such that proper segmentation and forwarding of the packet is performed.

Preferably, the segmentation cells are fixed-length cells that include a certain amount of payload data allocation. Because the segmentation cells are created as the packet is received, there is often residual payload data resulting from the creation of a segmentation cell. In other words, if a portion of the packet has been received that constitutes slightly more data than a segmentation cell can carry, the segmentation cell will be created with the maximum amount of data it can hold, whereas the remaining packet data is considered residual packet data. The residual packet data is stored in the ingress buffer 240 at a location corresponding to the particular packet. The amount of residual data stored for a packet and the ingress buffer 240 is described using an ingress buffer count, whereas the location of the residual data for the packet is described using a corresponding ingress buffer index. The ingress buffer index and corresponding ingress buffer count for each packet are included in the state information, or ingress status information, for that packet as stored in the ingress context table 230.

Thus, when the segmentation processor 220 receives a portion of a particular packet it references the ingress context table 230 to determine the current forwarding state of that packet. Based on this, the segmentation processor 220 can retrieve any residual data for that packet from the ingress buffer 240. This residual data that has been retrieved can then be combined with at least a portion of the newly received packet data for creation of a segmentation cell for transmission across the switching fabric. Any resulting residual packet data is then stored in the ingress buffer 240 based on the ingress buffer index, and the current ingress buffer count, as stored and the ingress context table 230, is updated to reflect the current amount of residual data for that particular packet stored and the ingress buffer 240. The segmentation of a packet into segmentation cells and the storage of the residual portions of the packet can be better understood with reference to FIGS. 2 and 3 which are discussed with additional detail below.

When the final portion of the packet is received, the segmentation processor 220 verifies that the packet has been successfully received by the ingress block. Once this has been accomplished, the segmentation processor 220 generates a destination decision for the packet, where the destination decision is included in a final segmentation cell provided to the switching fabric. The destination may have been determined when the first portion of the packet was received and pre-pended to the packet as well. Essentially, the destination decision determines what the egress line card does with the segmentation cells that it has received thus far for a particular packet. If the egress line card receives a destination decision that indicates that the packet was received successfully by the ingress line card, and also is able to verify the transmission across the switching fabric has occurred properly, the egress line card can then forward that packet to a destination connection. If the destination decision indicates that the packet was incorrectly received by the ingress line card, the segmentation cells received thus far by the egress line card are deemed invalid, and therefore are preferably purged rather than provided to a output connection.

Verification of proper receipt of a packet by the segmentation processor 220 can occur in a variety of ways. In one embodiment, a length parameter is included in the final portion of each packet. The segmentation processor 220 can compare this length parameter with the length of the packet received to verify that the length of the packet received is correct. This can be accomplished by maintaining a current ingress length parameter for each packet in the ingress status information stored in the ingress context table 230. Such an ingress length parameter is updated based on received portions of the packet such that it contains the current length of the packet as received. At the end of the packet, the length parameter included in the end portion of the packet can be compared with the current ingress length stored in the ingress context table 230 to determine if the length of the packet as received is correct.

In another embodiment, a cyclical redundancy check value is included in the end portion of each packet. The cyclical redundancy check (CRC) technique for data transmission verification is well known in the art. A current ingress CRC value can be maintained in the ingress status information stored in the ingress context table 230 in a similar manner to the ingress length value described above for each packet. When the end portion of a packet is received that includes a CRC value, the received CRC value can be compared with the current ingress CRC value stored in the ingress context table 230 to verify proper receipt of the packet.

When a packet is received by the ingress line card 210, some encapsulation information for the packet is typically removed prior to segmentation and forwarding. Once the encapsulation information has been removed, each of the segmentation cells is created such that each segmentation cell includes an internal encapsulation format that facilitates transfer of the segmentation cells across the switching fabric. Thus, in an ATM switch, each of the segmentation cells is an ATM cell that includes ATM header information to promote proper forwarding of the ATM cell across the switching fabric, which is an ATM backplane.

In other embodiments, the packet encapsulation is removed by the egress line card, as the egress line card has to modify the encapsulation information anyway. In such embodiments, the ingress line card preferably identifies the number of bytes of encapsulation that need to be removed and includes this information in the final cell. This simplifies the hardware required to perform the frame modification at the minimal additional cost of the extra data being passed across the switching fabric.

The encapsulation configuration of the packet is preferably stored in the ingress context table, which enables the segmentation processor 220 to properly isolate the packet. Additionally, the ingress context table 230 may store the forwarding decision information for each packet such that forwarding of the packet across the backplane of the switch is performed without having any repetitive determination of the forwarding information occur.

Because verification of the transmission of the packet across the switching fabric 270 is also desirable, a current switching fabric egress CRC and current egress length value for each packet may also be included in the ingress status information for the packet in the ingress context table 230. These egress values correspond to the CRC and length values that apply to the segmentation cells that have been provided to the switching fabric for a particular packet. Thus, when valid receipt of a packet is confirmed by the segmentation processor 220 and a final segmentation cell that includes the destination decision for the package is generated, the current egress CRC and egress length values can be included in the final segmentation cell such that they can be utilized by the egress line card for verification of internal transmission of the packet within the switch 200.

The CRC and length values that are sent over the switching fabric to the egress line card may either be re-calculated by the segmentation processor from scratch or may be derived from the original packet CRC (received CRC) and length value (received length). If the verification CRC sent over the switching fabric is derived from the received CRC, any changes to the packet (encapsulation, routing information, etc.) will be reflected in delta values included with the verification CRC, thus allowing verification of the packet as altered. Therefore, the verification CRC is produced by modifying the received CRC such that the verification CRC is valid for the packet as provided to the switching fabric. Similarly, the verification length parameter sent across the switching fabric would reflect the length of the packet as it is provided to the switching fabric. The modification of an existing CRC is known in the art and is described in detail in Annex J of the "Standard for Local and Metropolitan Area Networks-Supplement to Media Access Control (MAC) Bridges: Traffic Class Expediting and Dynamic Multicast Filtering" (P802.1p/D6) as published by the IEEE on Apr. 28, 1997.

The egress line card 280, which may simply be an egress block included in a line card within the switch 200, receives the segmentation cells from the switching fabric 270. The egress line card 280 then reassembles the packet to produce a reassembled packet from the segmentation cells. This reassembled packet is then forwarded based on at least a portion of the forwarding parameters that were included with the packet as received by the ingress line card 210. Preferably, the egress line card includes an egress buffer 310, an egress context table 300, and a reassembly processor 290.

The egress buffer 310 stores packets being reassembled where each packet being reassembled has a corresponding egress buffer index and a corresponding egress buffer count. Received segmentation cells for a packet being reassembled are stored in the buffer based on the corresponding egress buffer index and the egress buffer count of the packet being reassembled. The received segmentation cells may also be stored as linked lists of cells. Thus, as portions of a packet are received via segmentation cells, the packet is gradually reconstructed in the egress buffer from the segmentation cells received. The egress buffer index indicates a reference point for the particular packet within the egress buffer, and the egress buffer index indicates the location where the next portion of the packet should be stored in order to further reassembly of the packet.

The egress context table 300 stores egress status information for each of the packets being reassembled in the egress line card 280. The status information for each packet includes its egress buffer index and its egress buffer count. Additional status information may include CRC and length values corresponding to portions of the packet thus far received, along with any destination or forwarding decision information or encapsulation information regarding the particular packet. Such status information can be used to verify receipt of a packet from an ingress line card over the switching fabric 270. The status information can also be used to determine how the particular packet is to be provided to one of the outputs of the egress line card.

The reassembly processor 290 is operably coupled to the egress buffer and the egress context table, and the reassembly processor control storage of the segmentation cells for the packet in the egress buffer based on the status information for the packet in the egress context table. The reassembly processor may perform functions such as stripping off any internal encapsulation required to forward the portions of the packet included in the segmentation cells through the switching fabric 270.

Once the packet has been reassembled to produce a reassembled packet and the destination decision has been received in the final segmentation cell as generated by the segmentation processor, the reassembly processor forwards the reassembled packet via an output connection 312 determined based on the forwarding parameters for the packet. Preferably, forwarding of a reassembled packet does not occur until the entire packet has been reassembled in the egress buffer 310. This ensures that there is no intermingling of portions of multiple packets across a single virtual output connection. The intermingling of portions of packets is undesirable as it corrupts any such intermingled packets and invalidates their transmission. Thus, when a packet has been reassembled, it is forwarded in a continuous format over a particular output connection.

Figure 2:
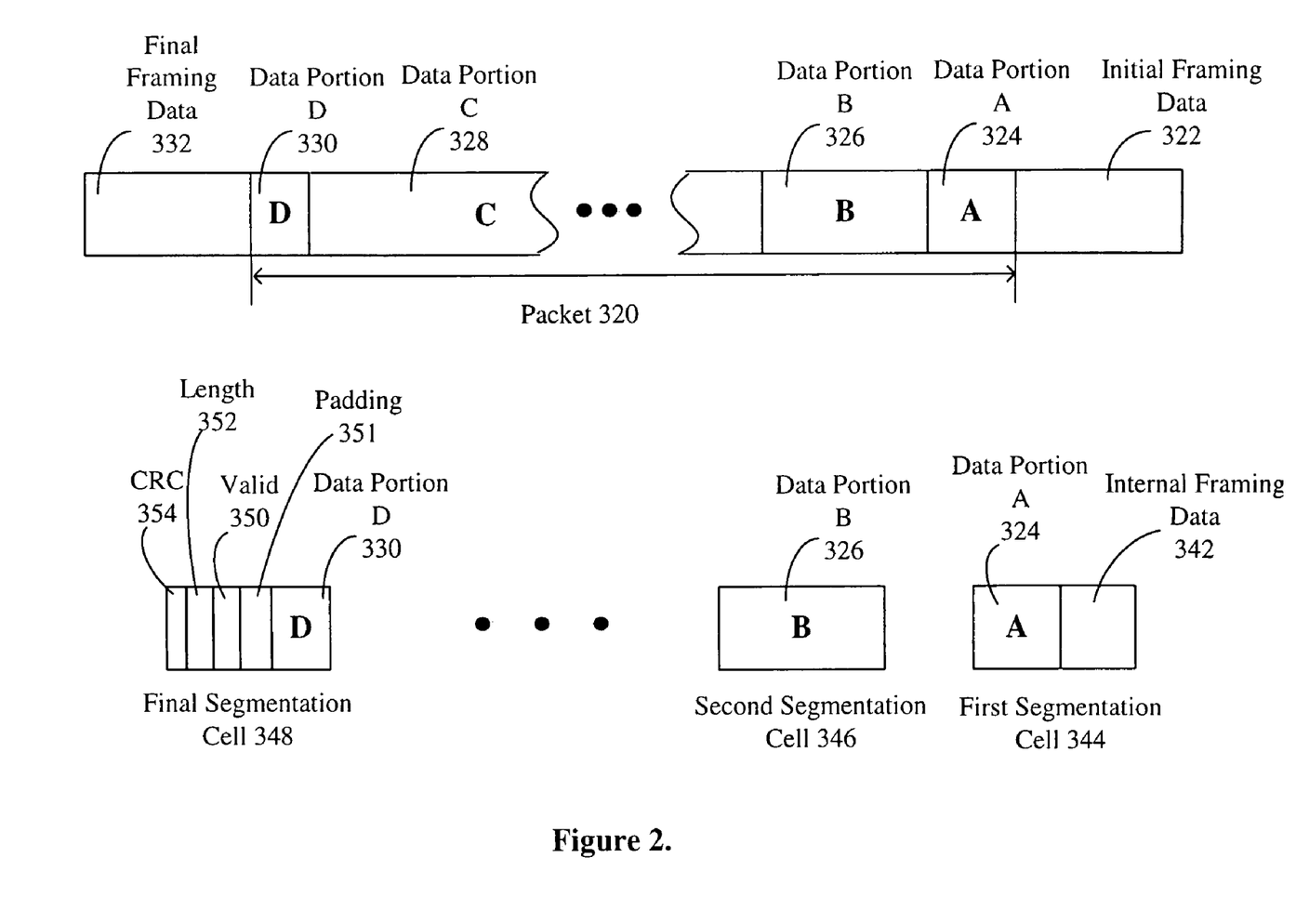
FIG. 2 illustrates a block diagram of segmentation of a packet received in a first format in accordance with the present invention.
Figure 3:
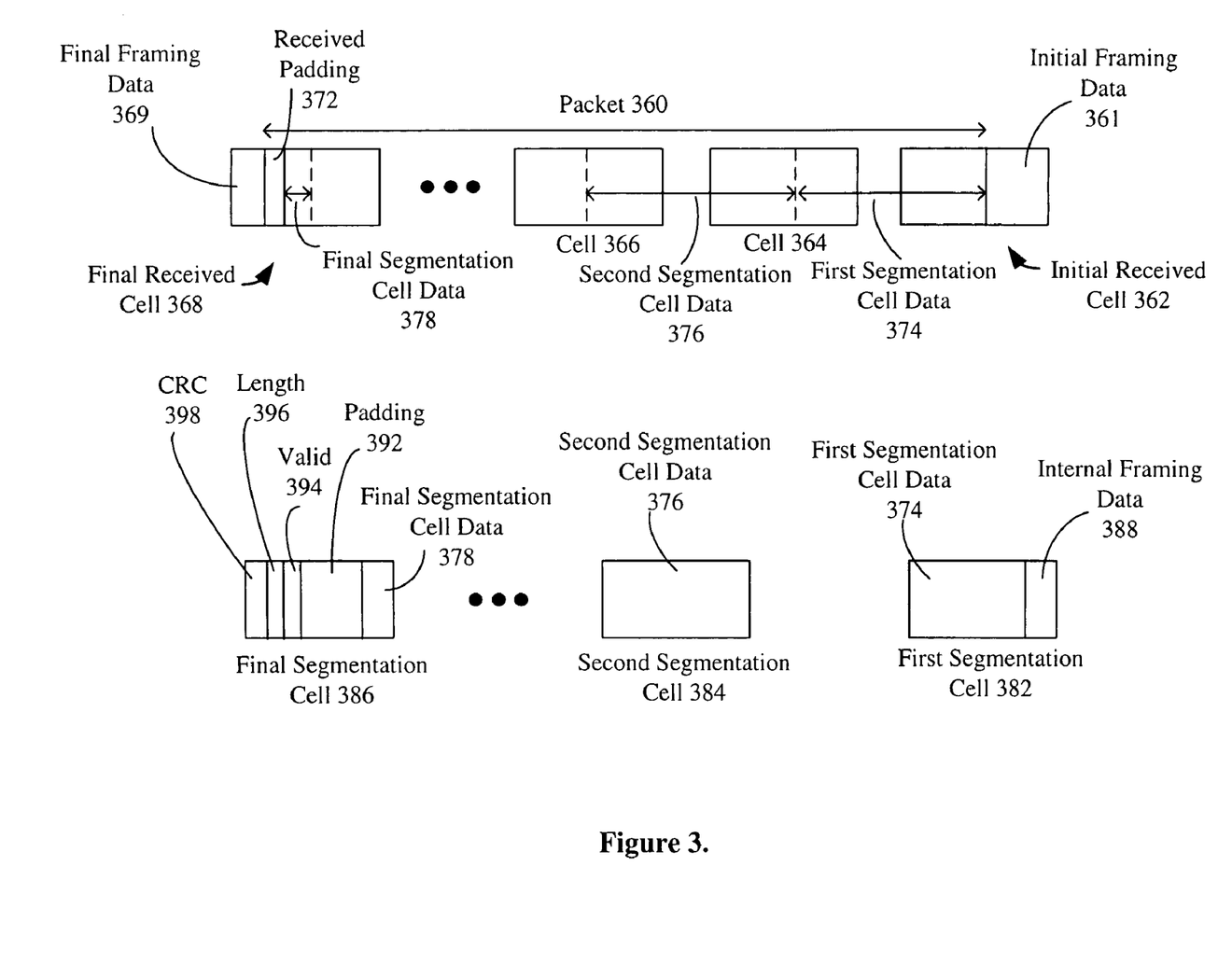
FIG. 3 illustrates a block diagram of segmentation of a packet received in a second format in accordance with the present invention.

Segmentation and forwarding of packets can be better understood with reference to FIGS. 2 and 3. FIG. 2 illustrates a block diagram of a packet 320 received in a first format. The first format is analogous to a packet over SONET format, which is known in the art. Preferably, the packet 320 is delivered in a frame that includes initial framing data 322 and final framing data 332. Such framing data is preferably stripped off by the segmentation processor 220 of the ingress line card 210. The segmentation processor 220 then determines when a sufficient portion of the packet 320 has been received to create a first segmentation cell 344. The first segmentation cell 344 includes any required internal framing data 342 and a payload, or data portion illustrated as data portion A 324. As can be seen from the diagram, the data portion A is a portion of the packet 320. The size of the portion is based on the size of the internal framing data 342 such that the first segmentation cell 344 is filled.

Although the first segmentation cell 344 only includes the data portion A 324, more data for the packet 320 may have been received. However, if the additional data for the packet 320 is insufficient to create the second segmentation cell 346, it will be buffered until a sufficient portion of the packet 320 has been received to generate the second segmentation cell 346. Thus, the ingress context table 230 may be referenced to determine the ingress buffer index and ingress buffer count for the packet 320 such that any residual portion of the packet can be stored in the ingress buffer 240. Once an additional portion of the packet 320 has been received that is sufficient to generate the second segmentation cell 346, the data portion B 326 is included in the second segmentation cell 346 which is then provided to the switching fabric 270. Note that the second segmentation cell 346 may include data that has recently been received and data that has been stored as a residual portion of a previously received portion of the packet 320.

As sufficient portions of the packet are received, additional segmentation cells are created and forwarded via the switching fabric 270. Thus, the data portion C 328 of the packet 320 will be broken up into a number segmentation cells that are transmitted as creation of each of the segmentation cells is completed.

When the final data portion D 330 of the packet 320 is received, it is included in the final segmentation cell 348. Note that the packet 320 may be accompanied by verification data such as a length parameter and a CRC parameter. If these parameters are included in the packet 320, a verification procedure can compare the CRC length or any other verification parameters with current stored parameters that are included in the ingress context table 230 for the packet.

The final segmentation cell 348 also includes the destination decision, or valid indication 350 that indicates whether or not the packet 320 has been properly received by the ingress line card 210. If the valid indication 350 indicates that the packet 320 has been properly received, the egress line card forwards the packet to its destination under the assumption that it is properly transmitted across the switching fabric. If the valid indication 350 indicates that the packet was incorrectly received, the egress line card 280 will purge the packet 320 rather than forward it in its corrupted state.

In order to determine whether the packet 320 is properly forwarded through the switching fabric 270, a CRC value 354 and/or a length value 352 may be included in the final segmentation cell 348. The CRC value 354 and length value 352 can be utilized to verify transmission of the segmentation cells through the switching fabric as was described earlier. In order to completely fill the final segmentation cell 348, some padding information 351 may be included in the final segmentation cell 348. The padding information 351 is merely a placeholder and is typically discarded upon receipt by the egress line card 280. Note that the padding may not be required in systems where variable length cells are supported. Note that the ordering of the various portions of the final segmentation cell 348 may be modified based on specific implementation.

FIG. 3 illustrates a block diagram of the segmentation of a packet 360 that is constructed through the receipt of a number of cells 362-368. Preferably, the received cells 362-368 are ATM cells, however any cell-based communication connection may provide the packet 360 in such a manner. The packet 360 is typically received in a format that includes some initial framing data 361 and final framing data 369. As was the case with the packet 320 of FIG. 2, the final framing data may include a CRC value, a length value, or another means of verifying proper receipt of the packet 360.

Figure 4:
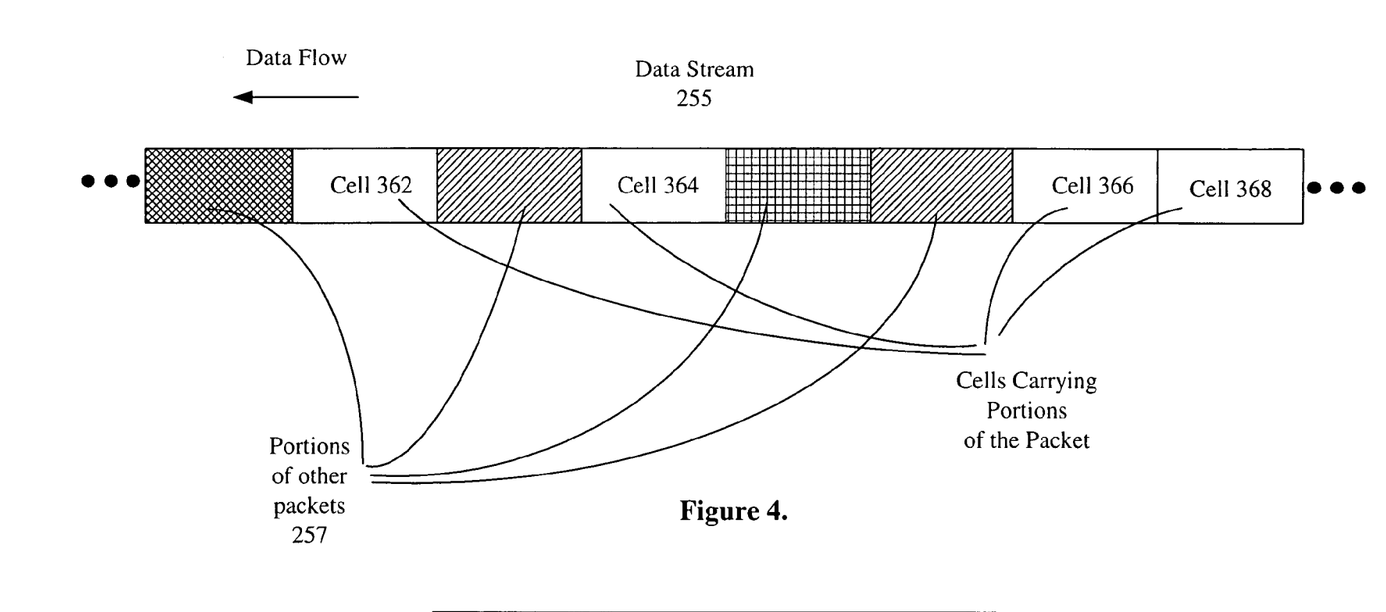
FIG. 4 illustrates a block diagram of a portion of a data stream that includes portions of a packet in accordance with the present invention.

The cells 362-368 may be received via a plurality of virtual connections that supply the packet to the ingress line card 210, or they may be provided over a single virtual connection. FIG. 4 illustrates a potential data stream 255 that includes the cells 362-368 carrying portions of the packet 360. Note that the cells 362-368 that include packet portions are interspersed with other cells carrying portions of other packets 257. Thus, the cells 362-368 may be spaced apart by a significant amount of time. In prior art systems, this would result in the requirement for buffering large received portions of the packet 360 until the entire packet was received. This could be especially troublesome for packets being transferred using lower qualities of transmission service, where these qualities of service may not receive the necessary bandwidth to provide the entire packet to the ingress line card in a timely manner.

As the data cells 362-368 that include the packet 360 are received, segmentation cells 382-386 are generated to carry the packet information through the switching fabric 270. The first segmentation cell 382 will be generated when a sufficient portion of the packet 360 has been received such that the destination for the packet can be determined and enough payload portion of the packet 360 has been received to fill the remainder of the first segmentation cell 382. Note that the segmentation cells generated are preferably of a fixed size.

The first segmentation cell data 374 that is included in the first segmentation cell 382 is illustrated to come from portions of the initial received cell 362 and the second received cell 364. This is because the portion of the first segmentation cell data 374 in the initial received cell 362 is inadequate to fill the payload capacity of the first segmentation cell 382. When the second received cell 364 is received, a portion of the information in that cell is used to supplement the data from the initial received cell 362 to generate the first segmentation cell data 374. This data is then included in the first segmentation cell 382, and as creation of the first segmentation cell 382 is completed, the first segmentation cell is provided to the switching fabric for transmission through the switch.

The remaining portion of the second received cell 364 that was not included in the first segmentation cell data 374 is stored in the ingress buffer 240 based on information contained in the ingress context table 230 as illustrated and described with respect to FIG. 1. Note that this residual data will be stored until the third received cell 366 is received. At this time, the residual portion of the second received cell 364 will be retrieved from the ingress buffer 240 and combined with a portion of the third received cell 366 to form the second segmentation cell data set 376 which is included in the second segmentation cell 384. Once again, any residual portion of the third received cell 366 is stored in the ingress buffer 240 in anticipation of the generation of subsequent segmentation cells as additional received cells are received.

When the final received cell 368 is received, the data portion of the final received cell is combined with any residual data stored in the ingress buffer 240. It is then determined whether or not this combined data set can be included in the final segmentation cell 386. In the event where the residual portion stored in the ingress buffer 240 that is combined with the data in the final received cell 368 exceeds the payload capacity of the final segmentation cell 386, a segmentation cell will be generated that includes as much of the remaining payload data as can be included in a segmentation cell. The final segmentation cell data 378 that is left over is then placed in the final segmentation cell 386.

The final segmentation cell 386 may also include a CRC value 398, a length value 396, and a valid indication 394, where the valid indication indicates valid receipt of the packet 360 by the ingress line card, and the CRC and length values 398 and 396 can be used to verify transmission of the segmentation cells through the switching fabric 270. Additional padding 392 is included in the final cell 386 such that the final segmentation cell is filled.

Once transmitted through the switching fabric 270, the final segmentation cell 386 can be used by the egress line card, or egress line cards in the case of a multi-cast packet, for verification of the packet 360. The packet 360 will then be fully assembled in the egress line card and, if valid reception of the packet has occurred, the packet will be re-encapsulated in a proper output format and provided to an output of the egress line card.

Figure 5:
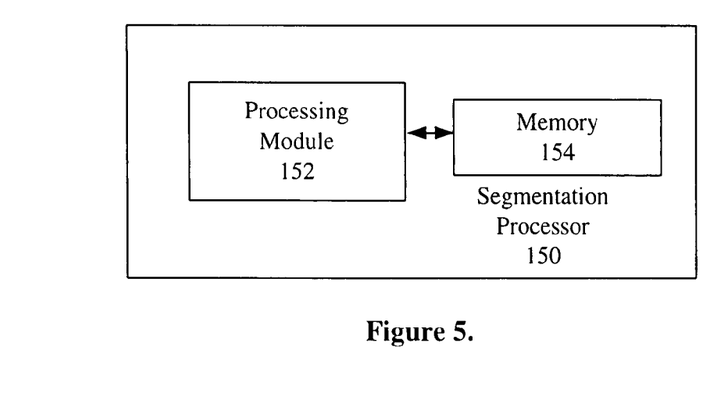
FIG. 5 illustrates a block diagram of a segmentation processor in accordance with the present invention.
Figure 6:
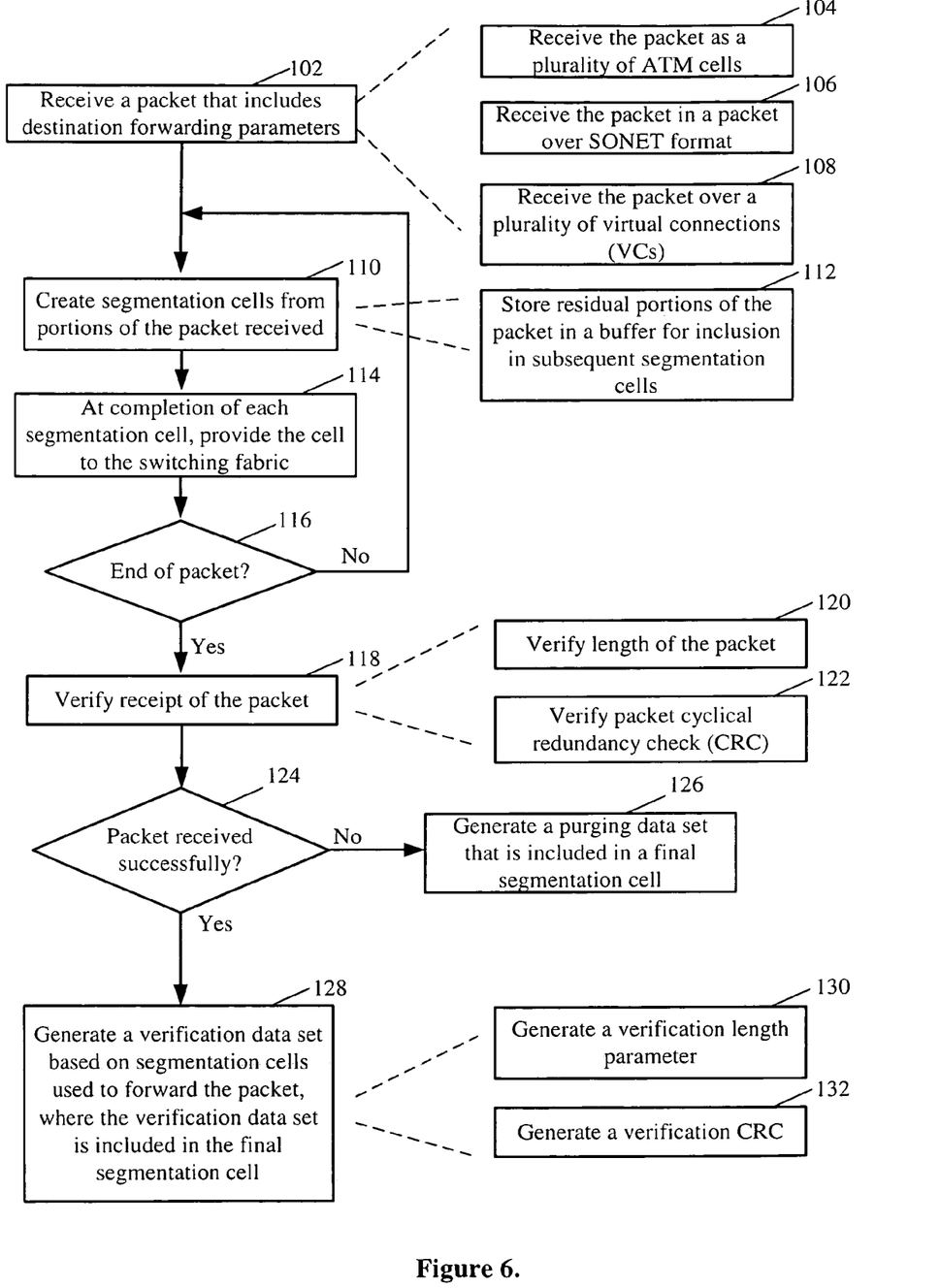
FIG. 6 illustrates a flow diagram of a method for segmenting and forwarding packets in accordance with the present invention.

FIG. 6 illustrates a flow diagram of a method for segmenting and forwarding packets. The method may be performed through the execution of a software algorithm, and such a software algorithm may be executed using a segmentation processor 150 as illustrated in FIG. 5. The segmentation processor 150 includes a processing module 152 and memory 154. The processing module 152 may be a single processing device or a plurality of processing devices. Such a processing device may be a microprocessor, microcontroller, digital signal processor, microcomputer, state machine, logic circuitry, and/or any device that processes information based on operational and/or programming instructions.

The memory 154 may be a single memory device or a plurality of memory devices. Such a memory device may be a read only memory device, random access memory device, floppy disk, hard drive memory, and/or any device that stores digital information. Note that when the processing module 152 has one or more of its functions performed by a state machine and/or logic circuitry, the memory containing the corresponding operational instructions is embedded within the state machine and/or logic circuitry. The memory 154 stores programming and/or operating instructions that, when executed, allow the processing module 152 to perform at least a portion of the steps of the method illustrated in FIG. 6. Note that the segmentation processor 150 may implement some of the functions of this method through software stored in the memory 154, whereas other portions may be implemented using hardware, or circuitry included within the segmentation processor 150. Thus, in some embodiments a mix of hardware and software may be used to perform the method of FIG. 6.

FIG. 6 illustrates a flow diagram of a method for segmenting and forwarding packets in a communication system, which is preferably a switch included within a communications network. More preferably, the method is employed within a network switch that receives packets in a format such as an ATM cell-based format, a Frame Relay format, a packet over SONET format, or any other packet- or cell-based network.

The method begins at step 102 where a packet is received that includes fields that specify at least destination forwarding parameters. The fields may specify a source IP address, a destination IP address, the type of service, the protocol, and upper layer ports that are used to determine the destination forwarding parameters. The destination forwarding parameters may include the output line card, port, or Virtual Connection Identifier (VCI) to which the packet is to be directed. At least a portion of this information must be relayed to the egress line card. Typically, the port information is always relayed. In ATM systems the VCI is included, and in frame relay the DLCI is included. Note that the packet received at step 102 may be received as shown in step 104 as a plurality of ATM cells. Note that these ATM cells may be received spaced out over time over one or more virtual connections as is indicated in step 108. In another embodiment, the packet is received as illustrated in step 106 in a packet over SONET format.

At step 110 segmentation cells are created from portions of the packet received. Preferably these segmentation cells are created as soon as adequate data for their creation is received. Examples illustrated in FIGS. 2 and 3 for packets 320 and 360 are good examples of the creation of segmentation cells from packets in different formats. Creating a segmentation cell at step 110 may further include encapsulating the segmentation cells in order to adapt them for transmission within the switching fabric to which they are supplied once their creation is complete.

Preferably, the first segmentation cell created is created as soon as adequate forwarding information for the packet is received and enough packet data to fill the payload of the first segmentation cell has also been received. Once a segmentation cell is generated from a portion of the packet received, any residual portion of the packet not included in segmentation cell is stored, at step 112, in a buffer for inclusion in subsequent segmentation cells. This residual portion will then be combined with subsequently received portions of the packet to create the subsequent segmentation cells. Once again, any residual portion of the packet resulting from the creation of any of these subsequent segmentation cells is stored in the buffer until it can be used with further portions of the packet received to generate further segmentation cells.

In order to determine where to store the residual portion of a particular packet, a buffer location for the packet is preferably fetched from a context table. The residual portion of the packet is then stored in the buffer based on the buffer location and a current buffer count that is also preferably stored in the context table. Once the residual portion of the packet is stored within the buffer, the current buffer count is updated to reflect storage of the residual portion in the buffer such that it can be retrieved for use in generating subsequent segmentation cells.

The context table for a particular packet may also be used to determine the current forwarding status of the packet and to store length and CRC values for the packet as it is received such that when the entire packet has been received verification of these values is possible. Furthermore, the context table can be used to store length and CRC values for the segmentation cells that have been assembled and forwarded across the backplane such that verification of the internal transmission of the packet within the switch is possible. This is described with respect to steps 128-132 below.

At step 114 each segmentation cell is provided to the switching fabric as creation of the segmentation cell is completed. Preferably this is done with minimal delay such that latency through the switch is minimized. Preferably, the switching fabric to which the segmentation cell is supplied is a backplane of a fixed-transfer-length switch, where the backplane intercouples a plurality of fixed-transfer-length line cards. In such an embodiment, the segmentation cells generated at step 110 are preferably fixed length segmentation cells adapted for transmission through the switching fabric. More preferably, the segmentation cells generated are ATM segmentation cells where the switching fabric is a backplane of an ATM switch. In such an embodiment, the backplane intercouples a plurality of ATM line cards where the ATM segmentation cells facilitate forwarding of packets amongst the plurality of ATM line cards.

At step 116 it is determined whether or not the end of the packet has been received. If not, the method repeats steps 110 and 114 such that subsequent segmentation cells are created and provided to the switching fabric as the packet continues to arrive. Once the end of the packet has been received, the method proceeds to step 118.

At step 118 verification of receipt of the packet is performed. This can include one or more of steps 120 and 122. At step 120 the length of the packet as received is verified. In the case of length verification, the packet will include a length parameter that is checked with a length parameter maintained in the context table for the packet. The length parameter in the context table is updated as the packet is received such that when the end of the packet has been received, the length parameter in the table stores a length value that can be compared with the length parameter included in the packet.

Similarly, at step 122 a cyclical redundancy check (CRC) is used to verify receipt of the packet. Verification of packets through CRC checks is well known in the art. A running CRC value for the packet can be maintained in the context table entry for the packet such that a final CRC value is available at the end of the packet for comparison with a CRC value included in the packet.

At step 124, it is determined whether or not the packet was or was not received successfully. This is determined based on the verification performed at step 118. If the packet was not received successfully, a purging data set is generated at step 126. This purging data set is included in the final segmentation cell provided to the switching fabric. The final segmentation cell also preferably includes at least a portion of the destination forwarding parameters (as described above with respect to step 102) and may further include billing account numbers. Upon receipt by the egress line card, or other receiving entity of the final segmentation cell, the purging data set preferably instructs the receiving entity to discard the entire packet as an unsuccessfully received packet was transferred across the backplane and should not be forwarded any further.

If it is determined at step 124 that the packet has been received successfully, the method proceeds to step 128 where a verification data set is generated. In its simplest form, the verification data set simply informs the egress line card that the packet was successfully received by the ingress line card, and therefore may be forwarded towards its final destination. This may be accomplished with a valid bit or bit field.

In other embodiments, the verification data set is more complex and is generated based on the segmentation cells used to forward the packet. Such a verification data set is then included in the final segmentation cell as it will allow the destination entity, or egress line card, to verify proper transmission of the segmentation cells through the switching fabric. Preferably, the verification data set includes a verification length parameter as shown in step 130 and/or a verification CRC parameter as illustrated in step 132.

The verification length parameter is maintained, preferably in the context table for the packet, to reflect length of the packet as the segmentation cells are created and provided to the switching fabric. In this case, when the final segmentation cell is created, the final value of the verification length parameter is known and can be included in the final segmentation cell. Similarly, the verification CRC can be maintained using a running CRC value that is stored in the context table for the packet, where the running CRC value is updated as segmentation cells are created and provided to the switching fabric. Thus, when the final segmentation cell is created, a final value of the running CRC value indicates the verification CRC value that is included in the final segmentation cell.

Once received by the egress line card, or other destination, the segmentation cells generated at step 112 and provided to the switching fabric at step 114 are used to reassemble the packet that is then forwarded to an output of the egress line card. The method for performing this reassembly and forwarding is preferably as was described with respect to the egress line card 280 of FIG. 1. Such methodology may be implemented in a reassembly processor analogous to the segmentation processor 150 illustrated in FIG. 5. In other words, the reassembly processor may include a processing module and memory that executes software instructions to perform the reassembly operations as were described with respect to FIG. 1.

Utilization of the method and apparatus described herein allows for segmentation and forwarding of packets in a data communications system with reduced requirements for buffering memory and reduced latency. This is accomplished by removing need to buffer an entire packet prior to segmentation and forwarding. By segmenting the packet as it is received and forwarding the segments as soon as they are created, the latency through the switch is reduced and the need for large buffers in the ingress line cards is greatly reduced.

In accordance with at least one embodiment of the present invention, a method for segmenting and forwarding packets is provided. The method comprises several steps. A packet is received, wherein the packet includes a destination that determines forwarding parameters. As the packet is being received, segmentation cells are created from portions of the packet received, wherein each segmentation cell is provided to a switching fabric as the segmentation cell is completed. When an end portion of the packet is received, verifying that the packet was received successfully is performed. When the packet has been received successfully, a verification data set is generated based on segmentation cells utilized to forward the packet, wherein the verification data set is included in a final segmentation cell that is provided to the switching fabric. When the packet has not been received successfully, a purging data set is generated that is included in the final segmentation cell that is provided to the switching fabric. Optionally, the packet is received in a first encapsulation format, wherein at least a portion of the first encapsulation format is removed from the packet prior to creation of the segmentation cells. Optionally, a second encapsulation format is added to the packet as the segmentation cells are created, wherein the second encapsulation format adapts the packet for transmission through the switching fabric.

Optionally, creating segmentation cells further comprises other steps. When a sufficient portion of the packet has been received to create a segmentation cell, the segmentation cell is created and the segmentation cell is provided to the switching fabric. Any residual portion of the packet not included in the segmentation cell is stored in a buffer.

Optionally, the residual portion of the packet is combined with subsequently received packet portions to create a subsequent segmentation cell, wherein any new residual portion of the packet resulting from creation of the subsequent segmentation cell is stored in the buffer.

Optionally, for a first segmentation cell, determining that a sufficient portion of the packet has been received for the first segmentation cell further comprises determining that enough of the packet has been received to determine a route for segmentation cells of the packet through the switching fabric and determining that enough of the packet has been received to fill available payload space within the first segmentation cell.

Optionally, storing any residual portion of the packet further comprises other steps. A buffer location for the packet is determined from a context table. The residual portion of the packet is stored in the buffer based on the buffer location and a current buffer count. The current buffer count is updated to reflect storage of the residual portion in the buffer.

Optionally, creating forwarding cells further comprises referencing the context table to determine current forwarding status of the packet.

Optionally, verifying that the packet was received successfully further comprises verifying at least one of: a received length parameter associated with the packet, and a received cyclical redundancy check parameter associated with the packet.

Optionally, generating the verification data set further comprises generating at least one of: a verification length parameter, wherein the verification length parameter is maintained to reflect length of the packet as provided to the switching fabric as the segmentation cells are created and provided to the switching fabric such that when the final segmentation cell is created, a final value of the verification length parameter is known; and a verification cyclical redundancy check, wherein a running cyclical redundancy check value is maintained as segmentation cells are created such that when the final segmentation cell is created a final value of the running cyclical redundancy check indicates the verification cyclical redundancy check for the packet as provided to the switching fabric.

Optionally, generating the verification data set further comprises at least one of: modifying the received length parameter based to produce a verification length parameter that reflects length of the packet as provided to the switching fabric; and modifying the received cyclical redundancy check parameter to produce a verification cyclical redundancy check that is valid for the packet as provided for the switching fabric.

Optionally, receiving the packet further comprises receiving the packet as a plurality of ATM cells.

Optionally, receiving the packet as a plurality of ATM cells further comprises receiving the packet as a plurality of ATM cells over a plurality of virtual connections. Optionally, receiving the packet further comprises receiving the packet in a packet over SONET format. Optionally, receiving the packet further comprises receiving the packet in a Frame Relay format.

Optionally, creating segmentation cells further comprises creating fixed-length segmentation cells, wherein the switching fabric is a backplane of a fixed-transfer-length switch, wherein the backplane intercouples a plurality of fixed-transfer-length line cards, wherein the fixed-length segmentation cells facilitate forwarding packets amongst the plurality of fixed-transfer-length line cards. Optionally, creating segmentation cells further comprises creating ATM segmentation cells, wherein the switching fabric is a backplane of an ATM switch, wherein the backplane intercouples a plurality of ATM line cards, wherein the ATM segmentation cells facilitate forwarding packets amongst the plurality of ATM line cards.

Optionally, a segmentation processor is provided for forwarding a packet that is received, wherein the packet includes a destination that determines forwarding parameters. The segmentation processor comprises a processing module and memory operably coupled to the processing module, wherein the memory stores operating instructions that, when executed by the processing module, cause the processing module to perform the several functions. As the packet is being received, segmentation cells are created from portions of the packet received, wherein each segmentation cell is provided to a switching fabric as the segmentation cell is completed. When an end portion of the packet is received, verifying that the packet was received successfully is performed. When the packet has been received successfully, a verification data set is generated based on segmentation cells utilized to forward the packet, wherein the verification data set is included in a final segmentation cell that is provided to the switching fabric. When the packet has not been received successfully, a purging data set is generated that is included in the final segmentation cell that is provided to the switching fabric.

Optionally, wherein the packet is received in a first encapsulation format, the memory includes operating instructions that, when executed by the processing module, cause the processing module to remove at least a portion of the first encapsulation format from the packet prior to creation of the segmentation cells. Optionally, the memory includes operating instructions that, when executed by the processing module, cause the processing module to add a second encapsulation format to the packet as the segmentation cells are created, wherein the second encapsulation format adapts the packet for transmission through the switching fabric.

Optionally, the memory includes operating instructions that, when executed by the processing module, cause the processing module to perform the function of creating segmentation cells such that creating segmentation cells further comprises, when a sufficient portion of the packet has been received to create a segmentation cell, creating the segmentation cell and providing the segmentation cell to the switching fabric; storing any residual portion of the packet not included in the segmentation cell in a buffer; combining the residual portion of the packet with subsequently received packet portions to create a subsequent segmentation cell, wherein any new residual portion of the packet resulting from creation of the subsequent segmentation cell is stored in the buffer.

Optionally, the memory includes operating instructions that, when executed by the processing module, cause the processing module to perform the function of creating segmentation cells such that, for a first segmentation cell, determining that a sufficient portion of the packet has been received for the first segmentation cell further comprises determining that enough of the packet has been received to determine a route for segmentation cells of the packet through the switching fabric and determining that enough of the packet has been received to fill available payload space within the first segmentation cell.

Optionally, the memory includes operating instructions that, when executed by the processing module, cause the processing module to perform the function of storing any residual portion of the packet such that storing any residual portion of the packet further comprises determining a buffer location for the packet from a context table; storing the residual portion of the packet in the buffer based on the buffer location and a current buffer count; and updating the current buffer count to reflect storage of the residual portion in the buffer.

Optionally, the memory includes operating instructions that, when executed by the processing module, cause the processing module to perform the function of creating forwarding cells such that creating forwarding cells further comprises referencing the context table to determine current forwarding status of the packet. Optionally, the memory includes operating instructions that, when executed by the processing module, cause the processing module to perform the function of verifying that the packet was received successfully such that verifying further comprises verifying at least one of: a received length parameter associated with the packet, and a received cyclical redundancy check parameter associated with the packet.

Optionally, the memory includes operating instructions that, when executed by the processing module, cause the processing module to perform the function of generating the verification data set such that generating the verification data set further comprises generating at least one of: a verification length parameter, wherein the verification length parameter is maintained to reflect length of the packet as provided to the switching fabric as the segmentation cells are created and provided to the switching fabric such that when the final segmentation cell is created, a final value of the verification length parameter is known; and a verification cyclical redundancy check, wherein a running cyclical redundancy check value is maintained as segmentation cells are created such that when the final segmentation cell is created a final value of the running cyclical redundancy check indicates the verification cyclical redundancy check for the packet as provided to the switching fabric.

Optionally, the memory includes operating instructions that, when executed by the processing module, cause the processing module to perform the function of generating the verification data set such that generating the verification data set further comprises at least one of: modifying the received length parameter based to produce a verification length parameter that reflects length of the packet as provided to the switching fabric; and modifying the received cyclical redundancy check parameter to produce a verification cyclical redundancy check that is valid for the packet as provided for the switching fabric.

Optionally, the packet is received as a plurality of ATM cells. Optionally, the packet is received as a plurality of ATM cells over a plurality of virtual connections. Optionally, the packet is received in a packet over SONET format. Optionally, the packet is received in a Frame Relay format.

Optionally, the memory includes operating instructions that, when executed by the processing module, cause the processing module to perform the function of creating segmentation cells such that creating segmentation cells further comprises creating fixed-length segmentation cells, wherein the switching fabric is a backplane of a fixed-transfer-length switch, wherein the backplane intercouples a plurality of fixed-transfer-length line cards, wherein the fixed-length segmentation cells facilitate forwarding packets amongst the plurality of fixed-transfer-length line cards.

Optionally, the memory includes operating instructions that, when executed by the processing module, cause the processing module to perform the function of creating segmentation cells such that creating segmentation cells further comprises creating ATM segmentation cells, wherein the switching fabric is a backplane of an ATM switch, wherein the backplane intercouples a plurality of ATM line cards, wherein the ATM segmentation cells facilitate forwarding packets amongst the plurality of ATM line cards.

It should be understood that the implementation of variations and modifications of the invention and its various aspects should be apparent to those of ordinary skill in the art, and that the invention is not limited to the specific embodiments described. It is therefore contemplated to cover by the present invention, any and all modifications, variations, or equivalents that fall within the spirit and scope of the basic underlying principles disclosed and claimed herein.

What is claimed is:

1. A segmentation and reassembly circuit, comprising:
a switching fabric;
an ingress block operably coupled to the switching fabric, wherein the ingress block receives a first packet, wherein the first packet includes a destination that determines forwarding parameters, wherein the ingress block includes:
an ingress buffer, wherein the ingress buffer stores portions of received packets, wherein each received packet has a corresponding ingress buffer index and a corresponding ingress buffer count;
an ingress context table, wherein the ingress context table stores ingress status information for at least the first packet, wherein the ingress status information includes an ingress buffer index and an ingress buffer count for the first packet;
a segmentation processor operably coupled to the ingress buffer and the ingress context table, wherein while the first packet is being received, the segmentation processor creates segmentation cells from portions of the first packet received, wherein each segmentation cell is provided to the switching fabric as it is completed, wherein when an end portion of the first packet is received, the segmentation processor verifies that the first packet was received successfully to produce a destination decision for the first packet, wherein the destination decision is included in a final segmentation cell provided to the switching fabric;
an egress block operably coupled to the switching fabric, wherein the egress block receives the segmentation cells for the first packet from the ingress block via the switching fabric, wherein the egress block reassembles the first packet to produce a reassembled first packet from the segmentation cells, wherein the egress block forwards the reassembled first packet based on at least a portion of the forwarding parameters.

2. The circuit of claim 1, wherein the ingress status information for the first packet further includes at least one of: encapsulation configuration of the first packet, forwarding decision information for the first packet, a current ingress length for the first packet, a current ingress cyclical redundancy check value for the first packet, and a current egress cyclical redundancy check value corresponding to segmentation cells for the first packet that have been provided to the switching fabric.

3. The circuit of claim 1, wherein the egress block further comprises:

an egress buffer, wherein the egress buffer stores portions of packets being reassembled, wherein each packet being reassembled has a corresponding egress buffer index and a corresponding egress buffer count, wherein received segmentation cells for a packet being reassembled are stored in the buffer based on the corresponding egress buffer index and the corresponding egress buffer count of the packet being reassembled;

an egress context table, wherein the egress context table stores egress status information for at least the first packet, wherein the egress status information includes an egress buffer index and an egress buffer count for the first packet; and an reassembly processor operably coupled to the egress buffer and the egress context table, wherein the reassembly processor controls storage of the segmentation cells for the first packet in the egress buffer based on the status information for the first packet in the egress context table, wherein when the first packet has been reassembled to produce a reassembled first packet and the destination decision received in the final segmentation cell indicates that reassembled first packet is valid, the reassembly processor forwards the reassembled first packet.

4. The circuit of claim 3, wherein the reassembly processor forwards the reassembled first packet in a continuous format over an output connection.

5. The circuit of claim 3, wherein the egress status information for the first packet further includes an egress cyclical redundancy check value corresponding to the segmentation cells for the first packet that have been received from the switching fabric.

6. The circuit of claim 1, wherein the switching fabric is an ATM backplane within an ATM switch, wherein the ATM switch intercouples a plurality of line cards, wherein the ingress block is included in a first line card of the plurality of line cards, wherein the egress block is included in a second line card of the plurality of line cards.

7. The circuit of claim 1, wherein the ingress block receives packets in at least one of: an ATM cell format, a Frame Relay Format, and a packet over SONET format.

8. The circuit of claim 7, wherein ingress block removes at least a portion of framing information that is included in received packets, wherein the ingress block encapsulates segmentation cells in an internal encapsulation format that facilitates transfer of the segmentation cells across the switching fabric.

9. A segmentation circuit adapted to couple to a switching fabric, wherein the segmentation circuit receives at least a first packet, comprising:

an ingress buffer, wherein the ingress buffer stores portions of received packets, wherein each received packet has a corresponding ingress buffer index and a corresponding ingress buffer count;

an ingress context table, wherein the ingress context table stores ingress status information for at least the first packet, wherein the ingress status information includes an ingress buffer index and an ingress buffer count for the first packet; and a segmentation processor operably coupled to the ingress buffer and the ingress context table, wherein while the first packet is being received, the segmentation processor creates segmentation cells from portions of the first packet received, wherein each segmentation cell is provided to the switching fabric as it is completed, wherein when an end portion of the first packet is received, the segmentation processor verifies that the first packet was received successfully to produce a destination decision for the first packet, wherein the destination decision is included in a final segmentation cell provided to the switching fabric.

10. The circuit of claim 9, wherein the segmentation processor determines when a sufficient portion of the first packet has been received to create a first segmentation cell, wherein the first segmentation cell includes internal framing information and a first payload, wherein the first payload includes a first portion of the first packet, wherein size of the first portion is based on size of the internal framing information such that the first segmentation cell is filled.

11. The circuit of claim 10, wherein the segmentation processor creates segmentation cells as sufficient portions of the first packet are received, wherein any residual received portion remaining after creation of a segmentation cell is stored in the ingress buffer such that it is available for combination with subsequent received portions to create subsequent segmentation cells.

12. The circuit of claim 11, wherein the ingress status information for the first packet further includes at least one of: encapsulation configuration of the first packet, forwarding decision information for the first packet, a current ingress length for the first packet, a current ingress cyclical redundancy check value for the first packet, and a current egress cyclical redundancy check value corresponding to segmentation cells for the first packet that have been provided to the switching fabric.

* * * * *